(12) United States Patent
Haddadin (10) Patent No.: US 10,675,756 B2
(45) Date of Patent: Jun. 9, 2020

(54) DEVICE AND METHOD FOR PERFORMING OPEN-LOOP AND CLOSED-LOOP CONTROL OF A ROBOT MANIPULATOR

(71) Applicant: KASTANIENBAUM GMBH, München (DE)

(72) Inventor: Sami Haddadin, Hannover (DE)

(73) Assignee: Kastanienbaum GmbH, München (DE)

( * ) Notice: Subject to any disclaimer, the term of this patent is extended or adjusted under 35 U.S.C. 154(b) by 107 days.

(21) Appl. No.: 15/548,377

(22) PCT Filed: Feb. 2, 2016

(86) PCT No.: PCT/EP2016/052198
§ 371 (c)(1),
(2) Date: Aug. 2, 2017

(87) PCT Pub. No.: WO2016/134931
PCT Pub. Date: Sep. 1, 2016

(65) Prior Publication Data
US 2018/0029228 A1 Feb. 1, 2018

(30) Foreign Application Priority Data
Feb. 24, 2015 (DE) .................. 10 2015 102 642

(51) Int. Cl.
B25J 9/16 (2006.01)
(52) U.S. Cl.
CPC .......... B25J 9/1641 (2013.01); B25J 9/1628 (2013.01); B25J 9/1633 (2013.01);
(Continued)
(58) Field of Classification Search
CPC ...... B25J 9/1661; B25J 9/1664; B25J 9/1669; B25J 9/1697; B25J 9/1674;
(Continued)

(56) References Cited
U.S. PATENT DOCUMENTS 7,646,161 B2 1/2010 Albu-Schäffer et al.
8,396,594 B2 * 3/2013 Okazaki ............... G05B 19/423
                                                                318/100
(Continued)

FOREIGN PATENT DOCUMENTS

DE          699 18 800 T2    12/2004
DE     10 2005 054 575 B3     4/2007
(Continued)

OTHER PUBLICATIONS

Wilfinger, Lee S., "A Comparison of Force Control Algorithms for Robots in Contact with Flexible Environments", Rensselaer Polytechnic Institute, Electrical, Computer, and Systems Engineering, Troy, New York, Dec. 1992, Cirsse Report #135.
(Continued)

Primary Examiner — Bao Long T Nguyen
(74) Attorney, Agent, or Firm — Hoffmann & Baron, LLP (57) ABSTRACT

The invention relates to a device and method for performing open-loop and closed-loop control of a robot manipulator that has an end effector, driven by a number M of actuators $ACT_m$. The invention includes a first unit which registers and/or makes available an external force wrench $\vec{F}_{ext}(t) = \{\vec{f}_{ext}(t), \vec{m}_{ext}(t)\}$ acting on the end effector, a controller which is connected to the first unit and to the actuators $ACT_m$ and which includes a first controller R1, which is a force controller, and a second controller R2 which is connected thereto and which is an impedance controller, an admittance controller, a position controller or a cruise controller, wherein the controller determines actuating variables $u_m(t)$ with which the actuators $ACT_m$ can be actuated in such way that when the end effector contacts a surface of an object, the end effector acts on the object with a desired force wrench $\vec{F}_D(t) = \{\vec{f}_D(t), \vec{m}_D(t)\}$; where $u_m(t) = u_{m,R1}(t) + u_{m,R2}$
(Continued)

(t), wherein the first controller R1 is embodied and configured in such a way that the actuating variable $u_{m,R1}(t)$ of R1 is determined as a product of a variable $u_{m,R1}(t)^*$ output by R1 and a function $S(v(t))$, or as a Q-dimensional function $S^*(v^*(t), u_{m,R1}(t)^*)$, where: $u_{m,R1}(t)=S(v(t)) \cdot u_{m,R1}(t)^*$ or $u_{m,R1}(t)=S^*(v^*(t), u_{m,R1}(t)^*)$; $v(t)=v(\vec{F}_D(t), \vec{R}(t))$; $v \in [v_a, v_e]$, $v^*(t)=v^*(\vec{F}_D(t), \vec{R}(t))=[v_1^*(\vec{F}_D(t), \vec{R}(t)), \ldots, v_Q^*(\vec{F}_D(t), \vec{R}(t))]$.

13 Claims, 4 Drawing Sheets

(52) U.S. Cl.
CPC ............... *G05B 2219/39343* (2013.01); *G05B 2219/39346* (2013.01); *G05B 2219/39347* (2013.01); *G05B 2219/39348* (2013.01); *G05B 2219/39467* (2013.01); *Y10S 901/09* (2013.01)

(58) Field of Classification Search
CPC ........ G05B 19/41805; G05B 19/41815; G05B 19/4183–41835; G05B 19/41865; G05B 2219/40116
USPC .......................................... 700/245, 250, 258
See application file for complete search history.

(56) References Cited

U.S. PATENT DOCUMENTS

| | | | |
|---|---|---|---|
| 9,102,061 B2 | 8/2015 | Schmirgel et al. | |
| 9,375,840 B2 | 6/2016 | Naderer et al. | |
| 2013/0310979 A1* | 11/2013 | Herr | B62D 57/032 700/258 |
| 2014/0330432 A1* | 11/2014 | Simaan | B25J 9/1633 700/250 |

FOREIGN PATENT DOCUMENTS

| | | |
|---|---|---|
| DE | 10 2009 018 403 A1 | 10/2010 |
| DE | 10 2010 012 598 A1 | 9/2011 |
| DE | 10 2010 019 640 A1 | 11/2011 |
| DE | 10 2011 006 679 A1 | 9/2012 |
| EP | 1052072 A1 | 11/2000 |

OTHER PUBLICATIONS

Ferraguti, Federica, et al., "A Tank-Based Approach to Impedance Control with Variable Stiffness", 2013 IEEE International Conference on Robotics and Automation, May 6-10, 2013, Karlsruhe, Germany.
Patarinski, Simeon, P., et al., "Robot Force Control: A Review", Mechatronics, vol. 3, No. 4, Aug. 1, 1993, pp. 377-398.
Lopes, Antonio, et al., "A force-impedance controlled industrial robot using an active robotic auxiliary device", Robotics and Computer Integrated Manufacturing, vol. 24, No. 3, Jun. 1, 2008, pp. 299-309.
Schindlbeck, Christopher, et al., "Unified Passivity-Based Cartesian Force/Impedance Control for Rigid and Flexible Joint Robots via Task-Energy Tanks", 2015 IEEE International Conference on Robotics and Animation (ICRA), May 26, 2015, pp. 440-447.
English translation of the Written Opinion of the International Searching Authority issued in International Application No. PCT/EP2016/052198 dated Sep. 8, 2017.

* cited by examiner

Fig. 1A Impedance Control
Fig. 1B Force Control
Fig. 1C Force- + Impedance Control

Fig. 6

DEVICE AND METHOD FOR PERFORMING OPEN-LOOP AND CLOSED-LOOP CONTROL OF A ROBOT MANIPULATOR

CROSS-REFERENCE TO RELATED APPLICATIONS

This application is the U.S. National Phase of, and Applicant claims priority from, International Application No. PCT/EP2016/052198, filed 2 Feb. 2016, and German Patent Application No. DE 10 2015 102 642.2, filed 24 Feb. 2015, both of which are incorporated herein by reference in their entirety.

BACKGROUND

Field

The invention relates to a device and method for performing open-loop and closed-loop control of a robot manipulator, which is driven by a number M of actuators $ACT_m$ and has an end effector, where m=1, 2, . . . , M. Further, the invention relates to a computer system having a data processing device, a digital storage medium, a computer program product and a computer program.

Related Art

It is known that robot manipulators can exceed humans in the performance of handling tasks with respect to repeatable speed and precision. With respect to sensitive exertion of force and compliancy, humans, however, are still superior to a robot manipulator regarding tasks, which primarily becomes apparent in real applications, which require objects to be sensitively manipulated or assembled. The latter requires a complex coordination of contact forces and sequence of movements.

"Impedance control" of robot manipulators is known in this context. The concept of impedance control of robot manipulators aims at imitating human behavior by active control of a robot manipulator, e.g., based on an externally animated mass spring damper model.

Generally, an intended compliancy of robot manipulators can be generated either by active control, by inserting compliant components into the robot manipulator or a combination of both. It is further known that it is not possible to create an arbitrary Cartesian compliancy solely by uncoupled elastic joints (Albu-Schäffer, Fischer, Schreiber, Schoeppe, & Hirzinger, 2004), so that a passive compliancy of a robot manipulator always requires to be combined with an active control to avoid the problem. In doing so, inaccuracies in the object model/surface model can be avoided, defined powers can be exerted onto the environment, and/or objects can be manipulated.

Furthermore, known is an "active interaction control". An active interaction control can be divided into "direct" and "indirect" force control (Villani & De Schutter, 2008). Recently, such force controllers having variations of the virtual position were introduced (Lutscher & Cheng, 2014 and Lee & Huang, 2010). Furthermore known is a power, position and/or impedance control under predetermined mandatory conditions in different spaces (Borghesan & De Schutter, 2014).

Although significant progress has been made in the field of robot manipulator control, the following disadvantages continue to exist.

For example, a purely impedance controlled robot manipulator generates the desired forces either based on a pure feed forward control or based on a respective displacement of a virtually desired position of an effector of the robot manipulator. Therefore, this controller class does not explicitly take into consideration external forces, which, however, is required if a predetermined force/torque of an effector of the robot manipulator is to be exerted onto an environment/object/work piece etc. with sufficient accuracy. Furthermore, the environment is required to be modelled with sufficient accuracy regarding its geometry and compliancy properties for this controller approach to work. This, however, contradicts the fundamental idea of impedance control to work in an unmodeled environment.

If a predefined large force is exerted onto an object (environment) by the effector of the robot manipulator via feed forward control, it is furthermore disadvantageous for a pure impedance controlled robot manipulator that a potentially dangerous instantaneous and large movement is executed by the robot manipulator (with respect to the travelled effector path, speed, and acceleration) in case of occurrence of loss of contact between effector and object. This is, e.g., conditioned by a virtually desired position of the effector being far away from the actual position of the effector in case of loss of contact.

Furthermore known is a "pure force control" of robot manipulators. A force control of a robot manipulator presents the basics to exchange external forces sufficiently enough with the environment and thus facilitates an exact manipulation of objects or the surfaces thereof. Such ability is an essential necessity in industrial applications of robot manipulators. Thus, the rather imprecise impedance control is no alternative for force control. These problems have caused diverse approaches of the so-called hybrid position force control (Raibert & Craig, 1981). These hybrid position force controls are based on the idea to partition a so-called "task space" into complementary force and position spaces so that force or torque and movement can be exerted and controlled in their separate spaces.

A disadvantage of known hybrid force controls is that they have very low robustness with respect to loss of contact of the robot manipulator with an environment. Furthermore, an environment is required to be exactly modelled in this case, as well, to secure good control performance, which, however, seldom exists with sufficient quality.

To show the stability of such controllers, the environment is typically modelled as a simple spring damper system. An overview on various force controllers including comments on the stability analysis thereof can be found in (Zeng & Hemami, 1997). A very general critique on such controllers is specified in (Duffy, 1990), because a wrong selection of the metrics or the coordinate system is oftentimes made.

SUMMARY

It is the object of the invention to specify a device and a method for performing open-loop closed-loop control of a robot manipulator having an end effector, driven by a number M of actuators $ACT_m$, where m=1, 2, . . . , M, which avoid the above mentioned disadvantages to a large extent. In particular, large movements of the robot manipulator after loss of contact by the end effector with an object can be avoided.

The invention becomes apparent from the features of the independent claims. Advantageous further developments and embodiments are subject of the dependent claims. Further features, application possibilities, and advantages of the invention will become apparent from the following description as well as the explanation of example embodiments of the invention, which are illustrated in the figures.

According to a first aspect, the object is solved by a device for performing open-loop and closed-loop control of a robot manipulator having an end effector, driven by a number M of actuators $ACT_m$, where m=1, 2, . . . , M. The term "actuators" is to be understood broadly. It includes, e.g., electric motors, linear motors, multiphase motors, Piezo actuators, etc.

The device further includes a first unit, which registers and/or makes available an external force wrench $\vec{F}_{ext}(t) = \{\vec{f}_{ext}(t), \vec{m}_{ext}(t)\}$, acting on the end effector, where $\vec{f}_{ext}(t):=$external force acting on the end effector and $\vec{m}_{ext}(t):=$external torque acting on the end effector. To do so, the first unit advantageously has a sensor system to register the external force wrench $\vec{F}_{ext}(t) = \{\vec{f}_{ext}(t), \vec{m}_{ext}(t)\}$ and/or an estimator to estimate the external force wrench $\vec{F}_{ext}(t) = \{\vec{f}_{ext}(t), \vec{m}_{ext}(t)\}$. The sensor system advantageously includes one or more force sensors and/or torque sensors. The estimator advantageously includes a processor to run a program that estimates the external force wrench $\vec{F}_{ext}(t)$.

Furthermore, the suggested device includes a controller connected with the first unit and the actuators $ACT_m$. The controller, in turn, includes a first controller R1, which is a force controller, and a second controller R2 connected thereto. The second controller R2 is an impedance controller, an admittance controller, a position controller, a cruise controller, or a combination thereof. The controller determines actuating variables $u_m(t)$, with which the actuators $ACT_m$ can be actuated in such way that when contact occurs with the surface of an object, the end effector acts on the object with a desired force wrench $\vec{F}_D(t) = \{\vec{f}_D(t), \vec{m}_D(t)\}$, wherein:

$$u_m(t) = u_{m,R1}(t) + u_{m,R2}(t) \quad (1)$$

with $\vec{f}_D(t):=$predetermined power, $\vec{m}_D(t):=$predetermined torque, $u_{m,R1}(t):=$actuating variables of the first controller R1, and $u_{m,R2}(t):=$actuating variables of the second controller R2 and t:=time. The desired force wrench $\vec{F}_D(t)$ is predefined for when the object is presented to the robot.

In doing so, the first controller R1 is embodied and configured in such way that an actuating variable $u_{m,R1}(t)$ of R1 is determined as a product of a variable $u_{m,R1}(t)^*$ output by R1 and a function $S(v(t))$, or as a Q-dimensional function $S^*(v^*(t), u_{m,R1}(t)^*)$, wherein:

$$u_{m,R1}(t) = S(v(t)) \cdot u_{m,R1}(t)^* \quad (2a)$$

$$u_{m,R1}(t) = S^*(v^*(t), u_{m,R1}(t)^*) \quad (2b)$$

$$v(t) = v(\vec{F}_D(t), \vec{R}(t)) \quad (3a)$$

$$v^*(t) = v^*(\vec{F}_D(t), \vec{R}(t)) = [v_1^*(\vec{F}_D(t), \vec{R}(t)), \ldots, v_Q^* (\vec{F}_D(t), \vec{R}(t))]$$

$$v^*(t) = [v_1^*(t), v_2^*(t), \ldots, V_Q^*(t)] \quad (3b)$$

$$v \in [v_a, v_e] \quad (4a)$$

$$v_1^*(t) \in [v_{1a}, v_{1e}], v_2^*(t) \in [v_{2a}, v_{2e}], \ldots, v_Q^*(t) \in [v_{Qa}, v_{Qe}] \quad (4b)$$

with: $u_{m,R1}(t)^*:=$a variable determined by the first controller R1 to generate the desired force wrench $\vec{F}_D(t)$; $\vec{R}(t):=$a control error made available by the controller, $S(v(t)):=$a monotonically decreasing function of v(t), which depends on desired force wrench $\vec{F}_D(t)$ and control error $\vec{R}(t)$; $S^*(v^*(t), u_{m,R1}(t)^*):=$a Q-dimensional function for which the influence of the variable $u_{m,R1}(t)^*$ is basically monotonically decreasing in each of Q individual components $[v_1^*(t), v_2^*(t), \ldots, V_Q^*(t)]$; $[v_a, v_e]:=$a predefined definition area of the variable v(t); and $[v_{1a}, v_{1e}], [v_{2a}, v_{2e}], \ldots, [v_{Qa}, v_{Qe}]$ a component-wise definition area of a vector quantity $v^*(t)$ of a dimension Q.

In one alternative, the invention features variables $u_{m,R1}(t)^*$ of force controller R1, which are determined conventionally, and multiplied with a monotonically decreasing function $S(v(t)) = S(v(\vec{F}_D(t), \vec{R}(t)))$ (so-called "shaping function" of desired force wrench and control error), thus generating actuating variables $u_{m,R1}(t)$ which altogether cause that, when the end effector loses contact with an environment (e.g., surface of an object), large movements of the robot manipulator can be excluded.

The "shaping" effect can also be achieved in another alternative, in which actuating variables $u_{m,R1}(t)$ are determined as a Q-dimensional function $S^*(v^*(t), u_{m,R1}(t)^*)$. In doing so, "shaping" effects according to the invention are achieved for all those configurations of the force controller, which cannot be represented mathematically as a product of variables $u_{m,R1}(t)^*$ and monotonically decreasing function $S(v(t))$. For example, individual components of a PID controller can have different, respectively monotonically decreasing shaping function $S^*_1(v^*_1(t)), S^*_2(v^*_2(t)), \ldots$.

The function $S(v(t))$ of the first alternative preferably has a value domain of [1, 0]. In case of contact of the end effector with the environment (normal operation), $S(v(t))=1$. If the end effector loses contact with the environment (e.g., surface of an object), then a large control error $\vec{R}(t)$ occurs at the controller. $S(v(t))$ is preferably actuated such that the larger the control error $\vec{R}(t)$ and the larger the desired force wrench $\vec{F}_D(t)$ to be applied by the end effector, the faster the function v(t) decreases from one (1) to zero (0). This applies analogously to Q-dimensional function $S^*(v^*(t))$ of the second alternative.

A further development of the proposed device is characterized in that—in case that the object with which the end effector is in contact and onto surface of which it exerts the desired force wrench $\vec{F}_D(t)$ is elastic and its surface is flexible—the controller takes into consideration predefined elasticity properties of the object when determining the actuating variables $u_m(t)$.

A further development of the proposed device is characterized in that a second unit is present, which serves as energy storage for passivation of the controller and stores energy T1 coming from the controller according to a predefined energy storage dynamic and delivers energy T2 to the controller, wherein the second unit and the controller form a closed loop, and an initialization of the unit with energy T0 depends on a determined or predefined expenditure of energy $E_{Expenditure}$ to perform a current task of the robot manipulator. In doing so, energy E stored by the second unit can be a virtual or a physical energy. In the first case, the virtual energy is only an operand. In the second case, the energy is a physical energy (e.g., electrical energy), wherein the second unit includes a corresponding physical energy storage (e.g., a battery). The second case of the further development facilitates not only an improved, i.e., passivated open-loop and closed-loop control of the robot manipulator, but also simultaneously a decrease of the expenditure of energy during operation of the robot manipulator.

An upper energy limit G1 is defined advantageously for the above further development, wherein the second unit is embodied and configured such that: E≤G1 is always true for the energy E stored in the second unit. Furthermore advantageously defined is a lower energy limit G2, with: 0<G2<G1, and the second unit is embodied such that, if: G2<E≤G1 is true for the energy E stored in the second energy unit, the second unit is coupled to the controller, and if E≤G2 is true, the second unit is uncoupled from the controller.

A further aspect of the invention relates to a robot having a robot manipulator with an end effector, driven by a number M of actuators $ACT_m$, which has a device as explained herein, where m=1, 2, . . . , M.

A further aspect of the invention relates to a method for performing open-loop and closed-loop control of a robot manipulator having an end effector, driven by a number M of actuators $ACT_m$, where m=1, 2, . . . , M, the method including the following steps: registering and/or making available an external force wrench $\vec{F}_{ext}(t)=\{\vec{f}_{ext}(t), \vec{m}_{ext}(t)\}$ acting on the end effector, where $\vec{f}_{ext}(t)$:=external force acting on the end effector, $\vec{m}_{ext}(t)$:=external torque acting on the end effector; determining actuating variables $u_m(t)$ using a controller, which includes a first controller R1, which is a force controller, and a second controller R2 connected therewith (second controller is an impedance controller, an admittance controller, a position controller, a cruise controller, or a combination thereof), with which the actuators $ACT_m$ are actuated in such way that when contact occurs with a surface of an object, the end effector acts on the object with a desired force wrench $\vec{F}_D(t)=\{\vec{f}_D(t), \vec{m}_D(t)\}$ wherein:

$$u_m(t) = u_{m,R1}(t) + u_{m,R2}(t) \quad (1)$$

where $\vec{f}_D(t)$:=predefined force; $\vec{m}_D(t)$:=predefined torque, $u_{m,R1}(t)$:=actuating variables of the first controller R1, and $u_{m,R2}(t)$:=actuating variables of the second controller R2, wherein the first controller R1 is embodied and configured in such way that an actuating variable $u_{m,R1}(t)$ is determined as a product of a variable $u_{m,R1}(t)^*$ output by R1 and a function $S(v(t))$, or as a Q-dimensional function $S^*(v^*(t), u_{m,R1}(t)^*)$, wherein:

$$u_{m,R1}(t) = S(v(t)) \cdot u_{m,R1}(t)^* \quad (2a)$$

$$u_{m,R1}(t) = S^*(v^*(t), u_{m,R1}(t)^*) \quad (2b)$$

$$v(t) = v(\vec{F}_D(t), \vec{R}(t)) \quad (3a)$$

$$v^*(t) = v^*(\vec{F}_D(t), \vec{R}(t)) = [v_1^*(\vec{F}_D(t), \vec{R}(t)), \ldots, v_Q^*(\vec{F}_D(t), \vec{R}(t))] $$

$$v^*(t) = [v_1^*(t), v_2^*(t), \ldots, V_Q^*(t)] \quad (3b)$$

$$v \in [v_a, v_e] \quad (4a)$$

$$v_1^*(t) \in [v_{1a}, v_{1e}], v_2^*(t) \in [v_{2a}, v_{2e}], \ldots, v_Q^*(t) \in [v_{Qa}, v_{Qe}] \quad (4b)$$

where: $u_{m,R1}(t)^*$:=is a variable determined by the first controller R1 to generate the desired force wrench $\vec{F}_D(t)$; $\vec{R}(t)$:=is a control error of the controller, $S(v(t))$:=is a monotonically decreasing function of $v(t)$, which is dependent on desired force wrench $\vec{F}_D(t)$ and control error $\vec{R}(t)$; $S^*(v^*(t), u_{m,R1}(t)^*)$:=is a Q-dimensional function, where the influence of the variable $u_{m,R1}(t)^*$ is generally monotonically decreasing in each of Q individual components $[v_1^*(t), v_2^*(t), \ldots, V_Q^*(t)]$; $[v_a, v_e]$:=a predefined definition area of the variable $v(t)$; and $[v_{1a}, v_{1e}], [v_{2a}, v_{2e}], \ldots, [v_{Qa}, v_{Qe}]$ is a component-wise definition area of a vector quantity $v^*(t)$ of a dimension Q.

Preferably, predefined elasticity properties of the object will be taken into consideration for the method by the controller during the determination of the actuating variables $u_m(t)$, in case that the object is elastic and thus its surface is flexible.

Furthermore, preferably, a second unit exists, which serves as energy storage for passivation of the controller, and which stores energy T1 coming from the controller and delivers energy 12 to the controller according to predefined energy storage dynamics, wherein the second unit and the controller form a closed loop and an initialization of the unit with an energy T0 depends on a determined or predefined expenditure of energy $E_{Expenditure}$ for implementation of a current task of the robot manipulator.

Advantages and preferred further developments of the suggested method result from an analogous and mutatis mutandis application of the above explanations regarding the suggested device.

A further aspect of the invention relates to a computer system having a data processing device, wherein the data processing device is designed such that a method as explained above is run on the data processing device.

A further aspect of the invention relates to a digital storage medium having electronically readable control signals, wherein the control signals can interact with a programmable computer system such that a method as explained above is run.

A further aspect of the invention relates to a computer program product having program code which is stored on a machine-readable carrier for implementation of the method as explained above if the program code is run on a data processing device.

A further aspect of the invention relates to a computer program having program codes to implement the method, as explained above, if the program runs on a data processing device. To do so, the data processing device can be designed as any computer system known in the art.

Figures 1A, 1B:
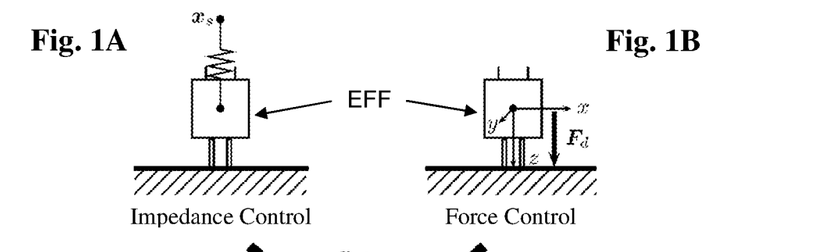
FIGS. 1A-C show a conceptually simplified diagrams to illustrate a suggested hybrid controller having an impedance controller and a force controller.
Figure 1C:
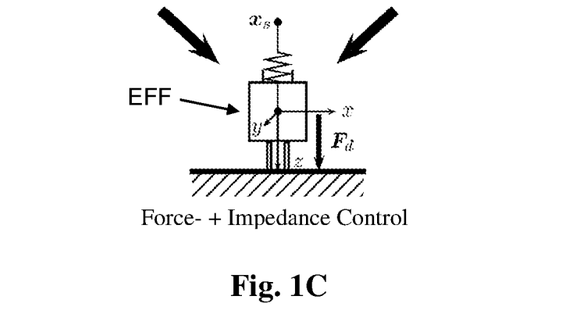

The suggested device and the suggested method for performing open-loop and closed-loop control of a robot manipulator having an end effector, driven by a number M of actuators $ACT_m$, where m=1, 2, . . . , M is therefore based on a robust, passive-based approach by combination of force control with impedance control (cf. FIG. 1) and with energy tanks. The invention facilitates acceptance of arbitrary passive environments and thus has no necessity for variations of the virtually desired position, which have a rather non-robust behavior. The invention allows for a robust, compliant, and stable manipulation of an environment by a robot manipulator without having to choose between force or impedance control. Furthermore, the described inherent disadvantage of force and impedance control is avoided and the advantages of force control and impedance control are combined, as best as possible. In particular, dangerous movements of the robot manipulator, which are caused by loss of contact of the end effector with the environment (e.g., surface of an object), are avoided.

The following explanations explain the invention in detail with respect to the topics in the following sections: A) robot modelling, B) controller design, C) stabilization of losses of contact, and D) handling of flexible and strongly compliant objects.

A Robot Modelling

A1 Rigid Body Dynamics

The known dynamics of a robot manipulator having n joints (degrees of freedom, DOF) is given by:

$$M(q)\ddot{q}+C(q,\dot{q})\dot{q}+g(q)=\tau_m+\tau_{ext} \quad (5)$$

where $q \in R^n$ is the joint position. The mass matrix is given by $M(q) \in R^{n \times n}$, the Coriolis and centrifugal vector by $C(q,\dot{q})\dot{q} \in R^n$, and the gravitation vector by $g(q) \in R^n$. The control input of the system is the motor torque $\tau_m \in R^n$, where $\tau_{ext} \in R^n$ includes all externally engraved torques. In doing so, friction is neglected to simplify the illustration. External forces in the Cartesian space are given by vector $F_{ext}:=(f_{ext}^T, m_{ext}^T)^T \in R^\epsilon$, which represents a force-torque vector. The vector can be depicted by the transposed Jacobian matrix $J^T(q)$ into external joint torques by $\tau_{ext}=J^T(q)F_{ext}$.

A2 Dynamics of Flexible Joints

For lightweight design robot manipulators or those with springs in the joints, assumption of equation (5) is not sufficiently exact to be able to describe the inherent dynamics which is created by the presence of flexible structures such as the transmission. Therefore, the (reduced) model for robot manipulators having elastic joints is assumed for such structures (Spong, 1987)

$$M(q)\ddot{q}+C(q,\dot{q})\dot{q}+g(q)=\tau_J+\tau_{ext} \quad (6)$$

$$B\ddot{\theta}+\tau_J=\tau_m \quad (7)$$

$$\tau_J=K(\theta-q) \quad (8)$$

where $\theta \in R^n$ is the motor position. Equations (6) and (7) each describe the output side and driving end dynamics. Equation (8) couples equations (6) and (7) by the joint torque $\tau_J \in R^n$, which is assumed as linear spring torque. This can be readily expanded to non-linear joint springs by a person skilled in the art. In doing so, the damping in the joints can be neglected since the expansion is trivial and is therefore not taken into consideration, herein. The matrices $K \in R^{n \times n}$ and $B \in R^{n \times n}$ are both constant, positive defined diagonal matrices, which each describe the stiffness of the joints and inertia of the motor. The output side and driving end dynamics are not taken into consideration, herein, either.

B Controller Design

B1 Cartesian Impedance Controller

A stable impedance control of robot manipulators having elastic joints can be achieved by a skillful passivation of the system. This is achieved, e.g., in that the position feedback takes place as function of $\theta$ instead of $\theta$ and q. To do so, q is replaced by its statistic equivalent $\bar{q}(\theta)=\zeta^{-1}(\theta)$, which is numerically achieved by a contraction with the implicit function $\zeta(q_e)=q_e+K^{-1}g(q_e)$, wherein $q_e$ is the output side position of the equilibrium point.

Under weak assumptions, $\bar{q}(\theta)$ can be used as estimator for q. Reference is made to (Albu-Schäffer, Ott, & Hirzinger, A Unified Passivity-based Control Framework for Position, Torque and Impedance Control of Flexible Joint Robots, 2007) for more details on the implicit function $\zeta$ as well as to the underlying theory. The passivity-based mathematical control law of impedance control for robot manipulators having flexible joints can now be formulated as follows:

$$\tau_{mi}=-J^T(q)(K_x\tilde{x}(\bar{q}(\theta))+D_x\dot{x}) \quad (9)$$

$$\tilde{x}(\theta)=\tilde{x}(\bar{q}(\theta))=f(\bar{q}(\theta))-x_s=x(\theta)-x_s \quad (10)$$

B2 Cartesian Force Controller

The controller design is based on a Cartesian force controller.

$$\tau_{mf}=J^T(\bar{q})((K_p-I)(F_{ext}(t)-F_d(t))+K_d(\dot{F}_{ext}(t)-\dot{F}_d(t))+K_i\int_B^t F_{ext}(t)-F_d(t))d\sigma) \quad (11)$$

where $K_d \in R^{6 \times 6}$ and $K_i \in R^{6 \times 6}$ are each diagonal, positive definite matrices for the differential and integral ratio of the controller. $I \in R^{6 \times 6}$ describes the identity matrix, and the matrix $K_p \in R^{6 \times 6}$ is selected such that $K_p-I$ is also diagonal and positive definite. The desired force $F_d:=(f_d^T,m_d^T)^T$ applied onto the environment is predefined by the user or a corresponding planer. Furthermore defined is $h_t(F_{ext}(t),t):=K_i\int_0^t F_{ext}(t)-F_d(t)d\sigma$ to improve subsequent readability. $F_{ext}$ can either be obtained by a force sensor or by an observer (Haddadin, Towards Safe Robots: Approaching Asimov's 1st Law, 2013). If the force controller is to be applied to a rigid robot, $\tau_m=\tau_{mf}$ is inserted into equation (5) and into equation (7) for robots with flexible joints.

B3 Unified Force and Impedance Controller

The simple combination of the above force and impedance controller leads to the following mathematical control law:

$$\tau_m=-J^T(q)((K_p-I)(F_{ext}(t)-F_d(t))+K_d(\dot{F}_{ext}(t)-\dot{F}_d(t))+K_i h_t+K_x\tilde{x}(\bar{q}(\theta))+D_x\dot{x}). \quad (12)$$

Figure 2:
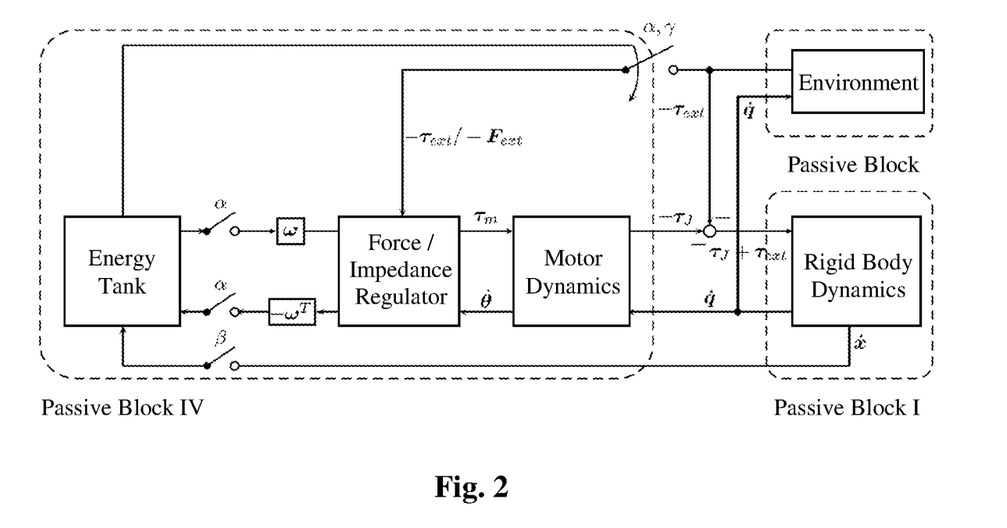
FIG. 2 shows a model system illustration for performing open-loop and closed-loop control of a robot manipulator, which interacts with the environment.

Stability, however, cannot be guaranteed by such law. Therefore, the controller is required to be augmented with an energy tank (cf. FIG. 2), so that the passivity and therefore, in turn, the stability of the system is warranted. Thus, a new mathematical control law is created:

$$\tau_m=-J^T(q)(\gamma K_d(\dot{F}_d(t)-\dot{F}_{ext}(t))-\omega x_t+K_x\tilde{x}(\bar{q}(\theta))+D_x\dot{x}), \quad (13)$$

where $x_t$ is the condition of the energy tank, and $\omega$ is defined by $$\omega = \frac{\alpha}{x_t}\left(K_p F_d + (1-\gamma)K_d(\dot{F}_d(t) - \dot{F}_{ext}(t)) - K_i h_i\right). \quad (14)$$

The dynamics of the energy tank can be described by:

$$\dot{x}_t = \frac{\beta}{x_t}\left(\dot{x}^T D_x \dot{x} + \gamma \dot{x}^T K_d(\dot{F}_d(t) - \dot{F}_{ext}(t))\right) + u_t. \quad (15)$$

The input of the energy tank is described herein as $u_t$. The binary scalars $\alpha$, $\beta$, $\gamma$ always guarantee the stability of the entire system.

B4 Task-Based Initialization

To calculate the task energy, the statistical balance of forces $f_I|_{x=x_w}+f_d=f_W$ is used, where $f_I=K_{x,t}(p-p_s)$ and $f_W=K_{W,t}(p_w-p_{w,0})$ are each the forces for the impedance stiffness and the counterforce of the environment. The counterforce, which is generated by a surface of an object, is modelled herein as a linear function in the stiffness without taking the dampening into consideration. By solving for $p_w$, the position of the surface is obtained, after the force was controlled. The required work to move this surface can be calculated as:

$$E_T = \int_0^t \frac{1}{2}(p_W(\sigma) - p_{W,0})^T K_{w,t}(p_W(\sigma) - p_{W,0})\,d\sigma. \quad (16)$$

Herein, only the translational energy is taken into consideration. Of course, an expansion for rotational cases is required, which is readily possible for the person skilled in the art.

For the specific control case $f_d$=konst., the task energy is calculated as:

$$E_T = \frac{1}{2}(p_W - p_{W,0})^T K_{w,t}(p_W - p_{W,0}). \tag{17}$$

The task energy is initialized accordingly.

C Stabilization of Losses of Contact

The stability of performing open-loop and closed-loop control of the robot manipulator is warranted for any conceivable cases, but this does not automatically mean that the robot manipulator performs exclusively secure movements. An unexpected loss of contact of the end effector with a surface of an object would still cause the robot having the robot manipulator to try to control a force until the energy tank is empty. Depending on the remaining energy in the energy tank, this can also cause large, fast and particularly undesired movements of the robot manipulator.

To avoid this, it could be suggested that the controller is simply deactivated as soon as contact is no longer detected between the end effector and the environment/the object. This, however, causes an undesired switching behavior based on, e.g., sensor noise.

To avoid this, a robust position-based method is suggested herein, which uses a controller-forming function $S(v):=\rho(\psi)$, which is integrated into the controller. Herein, it is as follows:

$$\rho(\psi) = (\rho_t(\psi), \rho_t(\psi), \rho_t(\psi), \rho_r(\psi), \rho_r(\psi), \rho_r(\psi))^T$$

and consists of a translational and a rotational ratio, each defined as:

$$\rho_t(\psi) := \begin{cases} 1 & \text{falls } f_d^T \Delta p \geq 0 \\ \frac{1}{2}\left[1 + \cos\left(\frac{\psi - \|\Delta p\|}{d_{max}}\pi\right)\right] & \text{falls } f_d^T \Delta p < 0 \wedge \psi \in [\|\Delta p\|, \|\Delta p\| + d_{max}] \\ 0 & \text{sonst} \end{cases}$$

and $$\rho_r(\psi) := \begin{cases} 1 & \text{falls } m_d^T \Delta k_0 \Delta k_v \geq 0 \\ \frac{1}{2}\left[1 + \cos\left(\frac{\psi - \Delta\varphi}{\varphi_{max}}\pi\right)\right] & \text{falls } m_d^T \Delta k_0 \Delta k_v < 0 \wedge \psi \in [\Delta\varphi, \Delta\varphi + \varphi_{max}] \\ 0 & \text{sonst} \end{cases}.$$

falls = if sonst = otherwise.

The function $\rho(\psi)$ in this example corresponds to the above function $S(v)$, and $\psi$ corresponds to the control error $\vec{R}(t)$ of the controller.

A robot posture $x:=(p^T, \varphi^T)^T$ consists of a translational ratio $p$ and a suitable rotational representation, such as, e.g., a Euler angle $\varphi$.

In the above, $\Delta p = p_s - p$ is the given vector, which points from the end effector to the virtually desired position and $F_d := (f_d^T, m_d^T)^T$ is the given desired 6-dimensional force wrench (cf. FIG. 2). As soon as $\Delta p$ and $f_d$ include an angle larger than 90° the controller should be deactivated.

To warrant a smooth transition, an interpolating function $\rho_t(\psi)$ is selected, which interpolates in a user-defined region $d_{max}$. For rotational ratio $\rho_r(\psi)$, quaternions are actuated as nonsingular representation. The unit quaternion $k=(k_0, k_v)$ indicates the current orientation and the quaternion $k_s=(k_{0,s}, k_{v,s})$ the desired orientation.

The rotational error is then defined as $\Delta k := k^{-1} k_s$ and $\Delta\varphi := 2 \arccos(\Delta k_0)$. The user-defined region, which represents a robustness, can be indicated by an angle $\varphi_{max}$, which represents a relationship with a scalar component of the quaternion by $\varphi_{max} := 2 \arccos(k_{0,max})$. From the point of view of stability analysis, this shaping function can be interpreted as a shaping of $\omega$, which only scales the force controller of the combined force and impedance controller. Therefore, $\omega$ can be newly defined as $\omega_\varphi := \rho(\psi)\omega$ and the stability is warranted, again. The multiplication of $\rho(\psi)$ is done component-wise, herein.

D Handling of flexible and Strongly Compliant Objects

If a position-based method is used for control, as introduced in the previous section, it must be taken into consideration that soft and deformable materials require a specific handling. To take into consideration a planning of the virtually desired position without compliancy or deformation of the environment, in some circumstances causes the problem that the force controller is involuntarily deactivated or scaled. This is conditioned by the fact that, currently, based on compliancy, another current position exists as compared to without the presence of compliancy. Therefore, a corrective virtually desired position $x'_d = (p'^T_d, \varphi'^T_d)^T$ is introduced to adjust the virtually desired position of the controller for such flexible and strongly compliant materials. $K_{mat}$ hereafter indicates the assumed (but not necessarily known) stiffness of the surface or object to be treated. A quasi-static mathematical correction law therefore is:

$$\begin{pmatrix} p'_d \\ \varphi'_d \end{pmatrix} = \begin{pmatrix} p_d \\ \varphi_d \end{pmatrix} - \begin{bmatrix} K_{t,mat} & K_{tr,mat} \\ K_{rt,mat} & K_{r,mat} \end{bmatrix}^{-1} \begin{pmatrix} f_d \\ m_d \end{pmatrix} \tag{18}$$

or, more briefly, $x'_d = x_d - K_{mat}^{-1} F_d$. It can be discerned that the virtually desired position is displaced such that the deviation caused by the soft-elastic material is corrected, accordingly (cf. FIG. 4). Of course, the environmental stiffness must be known or at least estimated for this approach. From equation (18) however, it follows intuitively, that for $K \to \infty$ the previous case is achieved. Of course, the law can also be extended in such way that a dampening of the environment is also taken into consideration. This however, aggravates the calculation.

REFERENCES

Albu-Schäffer, A., Fischer, M., Schreiber, G., Schoeppe, F., & Hirzinger, G. (2004). Soft robotics: What Cartesian stiffness can obtain with passively compliant, uncoupled joints. *IROS*.

Albu-Schäffer, A., Ott, C., & Hirzinger, G. (2007). A Unified Passivity-based Control Framework for Position, Torque and Impedance Control of Flexible Joint Robots. *The Int. J. of Robotics Research*, (p. 23-39).

Borghesan, G., & De Schutter, J. (2014). Constraint-based specification of hybrid position-impedance-power tasks. *IEEE International Conference on Robotics and Automation* 2014 *(ICRA2014)*.

Cervera, J., Van Der Schaft, A., & Banos, A. (2007). Interconnection of port-Hamiltonian systems and composition of Dirac structures. *Automatica* (p. 212-225). Elsevier.

Duffy, J. (1990). The fallacy of modern hybrid control theory that is based on orthogonal complements of twist and wrench spaces. (p. 139-144). Wiley Online Library.

Duindam, V., & Stramigioli, S. (2004). Port-based asymptotic curve tracking for mechanical systems. (p. 411-420). Elsevier.

Haddadin, S. (2013). *Towards Safe Robots: Approaching Asimov's 1st Law*. Springer Publishing Company, Incorporated.

Haddadin, S., Albu-Schäffer, A., De Luca, A., & Hirzinger, G. (2008). Collision detection and reaction: A contribution to safe physical human-robot interaction. *Intelligent Robots and Systems* (p. 3356-3363). IEEE.

Hogan, N. (1985). {Impedance Control: An approach to manipulation: Part I—Theory, Part II—Implementation, Part II—Applications. *ASME Journal of Dynamic Systems, Measurement, and Control*, (p. 1-24).

Lee, D., & Huang, K. (2010). Passive-set-position-modulation framework for interactive robotic systems. *IEEE Transactions on Robotics* (p. 354-369). IEEE.

Lutscher, E., & Cheng, G. (2014). Constrained Manipulation in Unstructured Environment Utilizing Hierarchical Task Specification for Indirect force Controlled Robots. *IEEE International Conference on Robotics and Automation 2014 (ICRA2014)*.

Raibert, M. H., & Craig, J. J. (1981). Hybrid position/power control of manipulators. *ASME Journal of Dynamical Systems, Measurement and Control*, (p. 126-133).

Spong, M. (1987). Modeling and Control of Elastic Joint Robots. *ASME J. on Dynamic Systems, Measurement, and Control*, (p. 310-319).

Villani, L, & De Schutter, J. (2008). force Control. In O. Khatib, *Springer Handbook of Robotics* (p. 161-185). Springer.

Zeng, G., & Hemami, A. (1997). An overview of robot force control. *Robotica* (p. 473-482). Cambridge Univ Press.

Further advantages, features and details result from the following description, in which—under reference to the drawing, if required—at least one example embodiment is described in detail. Same, similar and/or identically functioning components are indicated with the same reference numerals.

DETAILED DESCRIPTION

FIGS. 1A-1C shows a conceptually simplified diagrams to illustrate a suggested hybrid controller having an impedance controller and a force controller. Dampers are not shown for reasons of clarity. FIG. 1A shows a pure impedance controlled robot manipulator having an end effector EFF. The impedance control is indicated by the illustrated spring. FIG. 1B shows a pure force controlled robot manipulator having an end effector EFF, which presses with a predefined force $F_d$ against an object surface (shaded line). FIG. 1C shows a combination of the force controller and the impedance controller according to the invention from FIG. 1A and FIG. 1B.

FIG. 2 shows a model system illustration for performing open-loop and closed-loop control of a robot manipulator according to the invention having an end effector, which interacts with an environment/object/workpiece. Represented as function blocks are the environment (=: "environment"), which interacts with the robot manipulator (=: "rigid body dynamics") and the actuators (=: "motor dynamics"). The control and regulation of the actuators is implemented by a controller (=: "force/impedance controller"), to which an energy tank (=: "energy tank") can be coupled. The connections and feedback connections of the blocks, which are interconnected with one another, are shown with the corresponding in/outputs and exchanged quantities. By decoupling of the controller from the energy tank in case of violation of the passivity of the controller, feedback of the external forces is annulled.

Figure 3A:
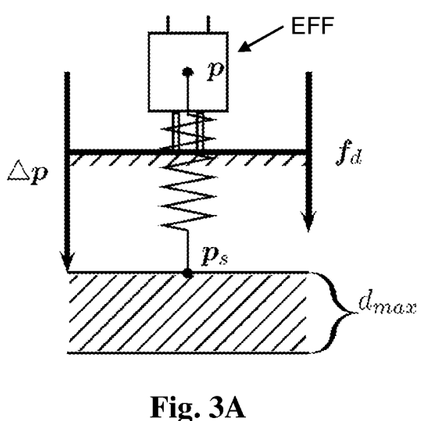
FIG. 3A shows a schematized illustrated impedance controlled robot manipulator having an end effector EFF and a predefined translational robustness region $d_{max}$.

FIG. 3A shows a schematized illustrated impedance controlled robot manipulator having an end effector EFF and a predefined translational robustness region $d_{max}$. As illustrated $\Delta p=p_s-p$ indicates the vector, which points from the end effector position p to a set point $p_s$, wherein $f_d$ indicates the predefined force wrench.

Figure 3B:
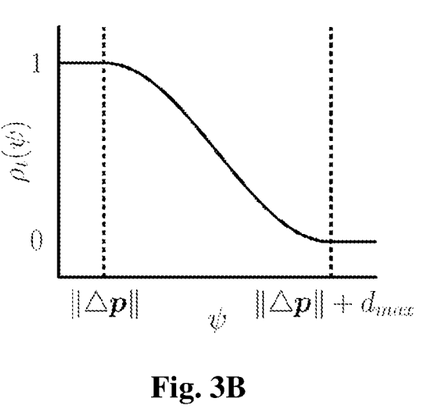
FIG. 3B shows a controller shaping function $\rho(\psi)=S(v(t))$ for the translational case.

FIG. 3B shows a controller shaping function $p(\psi)=S(v(t))$ for the translational case. More detailed illustrations regarding the function $p(\psi)$ can be found in the above description (cf. Part: "C Stabilization of losses of contact").

Figure 4:
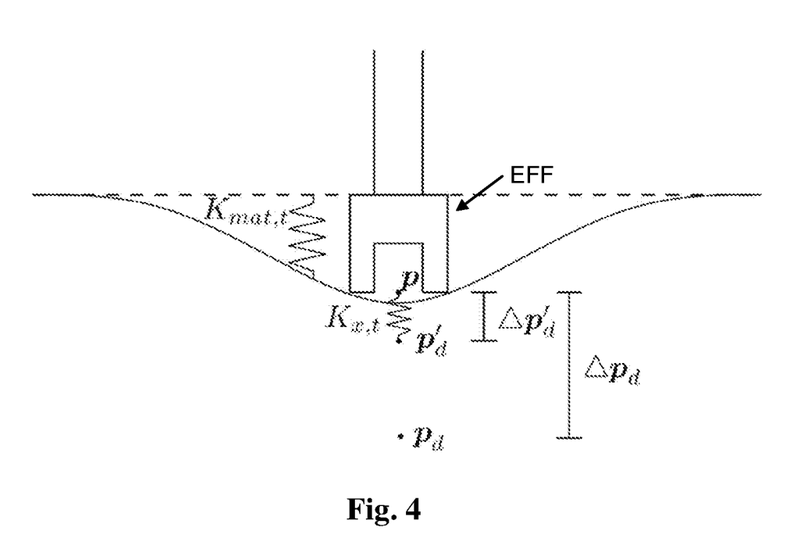
FIG. 4 shows a graph for deformation of elastic material by applied pressure of the end effector in the translational case.

FIG. 4 shows a graph for deformation of elastic material by applied pressure of the end effector EFF in the translational case, which illustrates in the above description in more detail (cf. Part "D Handling of flexible and strongly complaint objects").

Figure 5A:
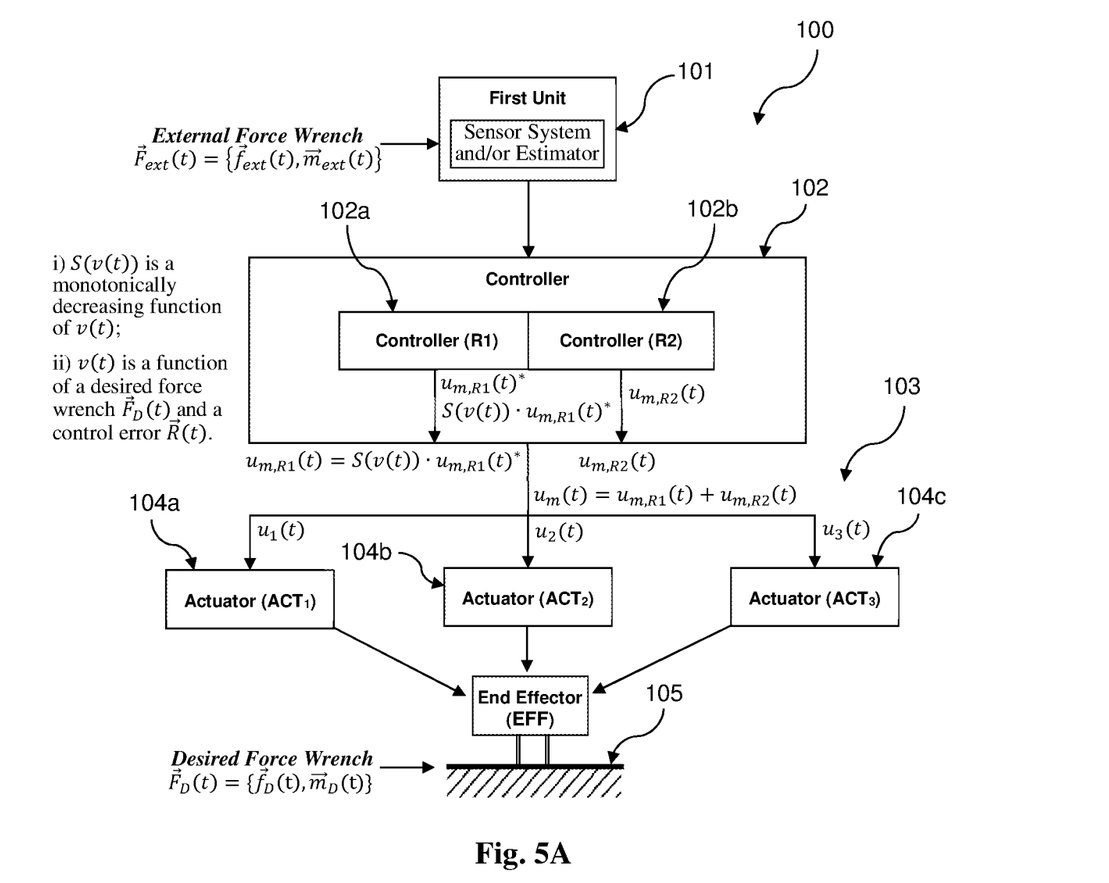
FIG. 5A and FIG. 5B show schematized block diagrams of a suggested device.
Figure 5B:
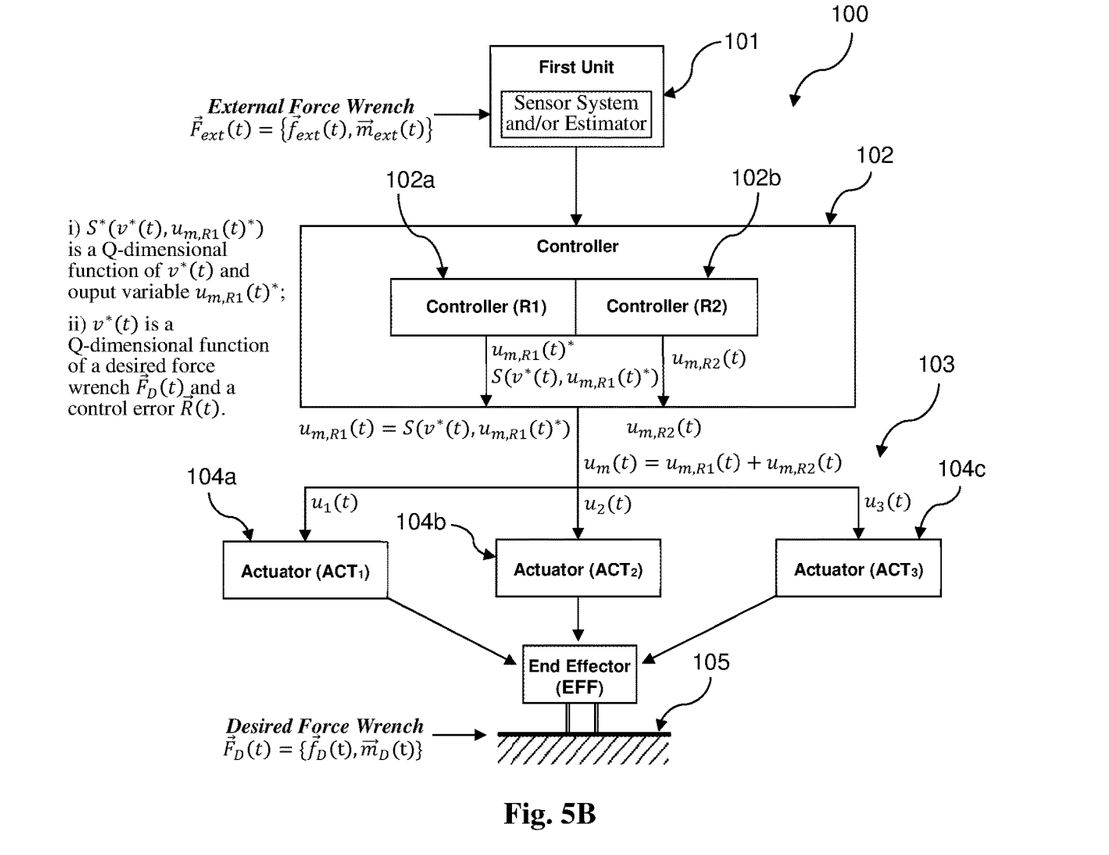

FIG. 5A and FIG. 5B show schematized block diagrams of a suggested device 100 for performing open-loop and closed-loop control of a robot manipulator 103 having an end effector EFF, driven by a number M of actuators $ACT_m$ 104a-104c, where m=1, 2, 3. The device 100 includes a first unit 101 and a controller 102, while the robot manipulator 103 includes actuators 104a-104c and the end effector EFF.

The first unit 101 registers and/or makes available an external force wrench $\vec{F}_{ext}(t)=\{\vec{f}_{ext}(t), \vec{m}_{ext}(t)\}$ acting on the end effector EFF of the robot manipulator 103, wherein $\vec{f}_{ext}(t)$:=external force acting on the end effector EFF;

$\vec{m}_{ext}(t)$:=external torque acting on the end effector EFF.

The controller 102 is connected with the first unit 101 and the actuators $ACT_m$ 104a-104c. The controller 102 includes a first controller R1 102a, which is a force controller, and a second controller R2 102b connected therewith, which is an impedance controller. The controller 102 determines actuating variables $u_m(t)$, by which the actuators $ACT_m$ 104a-

104c can be actuated in such way that when contact occurs with the surface of an object 105, the end effector acts on the object with a desired force wrench $\vec{F}_D(t)=\{\vec{f}_D(t),\vec{m}_D(t)\}$, wherein: $u_m(t)=u_{m,R1}(t)+u_{m,R2}(t)$, where: $\vec{f}_D(t):=$predefined force; $\vec{m}_D(t):=$predefined torque, $u_{m,R1}(t):=$actuating variables of the first controller R1 102a, and $u_{m,R2}(t):=$actuating variables of the second controller R2 102b.

In a first embodiment of the device shown in FIG. 5A, the first controller R1 102a is embodied and configured such that an actuating variable $u_{m,R1}(t)$ is determined as a product of a variable $u_{m,R1}(t)^*$ output by controller R1 and a function $S(v(t))$, wherein: $u_{m,R1}(t)=S(v(t))\cdot u_{m,R1}(t)^*$, $v(t)=v(\vec{F}_D(t), \vec{R}(t))$, $v\in[v_a, v_e]$, where: $u_{m,R1}(t)^*:=$a variable determined by the first controller R1 to generate the desired force wrench $\vec{F}_D(t)$, $\vec{R}(t):=$a control error of the controller 102, $S(v(t)):=$a monotonically decreasing function of $v(t)$, which depends on desired force wrench $\vec{F}_D(t)$ and control error $\vec{R}(t)$, and $[v_a, v_e]:=$a predefined definition area of the variable $v(t)$.

In a second embodiment of the device shown in FIG. 5B, the first controller R1 is embodied and configured such that an actuating variable $u_{m,R1}(t)$ of R1 is determined as a Q-dimensional function $S^*(v^*(t), u_{m,R1}(t)^*)$, wherein: $S^*(v^*(t), u_{m,R1}(t)^*):=$a Q-dimensional function, where the influence of the variable $u_{m,R1}(t)^*$ output by R1 is generally monotonically decreasing in each of Q individual components $[v_1^*(t), v_2^*(t), \ldots, V_Q^*(t)]$, $[v_{1a}, v_{1e}]$, $[v_{2a}, V_{2e}], \ldots, [V_{Qa}, v_{Qe}]$ is a component-wise definition area of a vector quantity $v^*(t)$ of a dimension Q.

Figure 6:
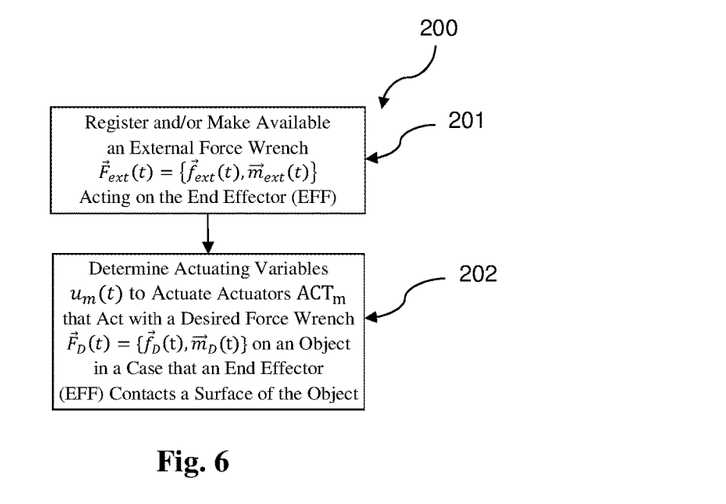
FIG. 6 shows a schematized flowchart of a suggested method.

FIG. 6 shows a schematized flowchart of a suggested method 200 for performing open-loop and closed-loop control of a robot manipulator having an end effector, driven by a number M of actuators $ACT_m$, where $m=1, 2, \ldots, M$. The method includes the following steps.

In step 201, there is a registering and/or making available of an external force wrench $\vec{F}_{ext}(t)=\{\vec{f}_{ext}(t), \vec{\tau}_{ext}(t)\}$ acting on the end effector, where: $\vec{f}_{ext}(t):=$external force acting on the end effector, $\vec{m}_{ext}(t):=$external torque acting on the end effector.

In step 202, there is a determining of actuating variables $u_m(t)$, by which actuators $ACT_m$ are actuated such that, the end effector in case of contact with a surface of an object acts on the object with a desired force wrench $\vec{F}_D(t)=\{\vec{f}_D(t), \vec{m}_D(t)\}$, by a using controller 102. As described herein, the controller 102 includes a first controller R1, which is a force controller, and a second controller R2 connected therewith, which is an impedance controller, wherein: $u_m(t)=u_{m,R1}(t)+u_{m,R2}(t)$, wherein: $\vec{f}_D(t):=$predefined force; $\vec{m}_D(t):=$predefined torque, $u_{m,R1}(t):=$actuating variables of the first controller R1, and $u_{m,R2}(t):=$actuating variables of the second controller R2.

In a first embodiment of the controller 102, the first controller R1 determines an actuating variable $u_{m,R1}(t)$ as product of a variable $u_{m,R1}(t)^*$ output by R1 and a function $S(v(t))$, wherein: $u_{m,R1}(t)=S(v(t))\ u_{m,R1}(t)^*$, $v(t)=v(\vec{F}_D(t), \vec{R}(t))$, and $v\in[v_a, v_e]$, where: $u_{m,R1}(t)^*:=$a variable determined by the first controller R1 for generation of the desired force wrench $\vec{F}_D(t)$, $\vec{R}(t):=$a control error of the controller 102, $S(v(t)):=$a monotonically decreasing function of $v(t)$, which depends on $\vec{F}_D(t)$ and $\vec{R}(t)$, $[v_a, v_e]:=$a predefined definition area of the variable $v(t)$.

In a second embodiment of the controller 102, the first controller R1 determines an actuating variable $u_{m,R1}(t)$ as a Q-dimensional function $S^*(v^*(t), u_{m,R1}(t)^*)$, wherein: $S^*(v^*(t), u_{m,R1}(t)^*):=$is a Q-dimensional function, where the influence of the variable $u_{m,R1}(t)^*$ output by R1 is generally monotonically decreasing in each of Q individual components $[v_1^*(t), v_2^*(t), \ldots, V_Q^*(t)]$, $[v_{1a}, v_{1e}]$, $[v_{2a}, v_{2e}], \ldots, [v_{Qa}, v_{Qe}]$ is a component-wise definition area of a vector quantity $v^*(t)$ of a dimension Q.

Although the invention was illustrated and explained in more detail by preferred example embodiments, the invention is not limited by the disclosed examples, and other variations can be derived therefrom by the person skilled in the art without leaving the scope of protection of the invention. It is therefore understood, that a plurality of variation possibilities exists. It is also understood, that example stated embodiments do indeed represent mere examples, which are not to be interpreted in any way as limitation of, e.g., the scope of protection, the application possibilities or the configuration of the invention. Rather, the previous description and the description of the figures enable the person skilled in the art to specifically implement the example embodiments, wherein the person skilled in the art can implement various changes with the knowledge of the disclosed idea of the invention, for example with respect to the function or arrangement of individual elements mentioned in an example embodiment, without leaving the scope of protection, which is defined by the claims and their legal equivalences, such as the further explanation in the description.

What is claimed is:

1. A device to perform open-loop and closed-loop control of a robot manipulator having an end effector, driven by a number M of actuators $ACT_m$, where $m=1, 2, \ldots, M$, the device comprising:

a first unit to register and/or make available an external force wrench $\vec{F}_{ext}(t)=\{\vec{f}_{ext}(t), \vec{m}_{ext}(t)\}$ acting on the end effector, where:

$\vec{f}_{ext}(t):=$external force acting on the end effector, $\vec{m}_{ext}(t):=$external torque acting on the effector; and a controller connected to the first unit and the actuators $ACT_m$, the controller comprising a first controller R1 and a second controller R2 connected therewith, the first controller R1 is a force controller, and a second controller R2 is an impedance controller, an admittance controller, a position controller, or a cruise controller, wherein the controller determines actuating variables $u_m(t)$, by which the actuators $ACT_m$ are actuated in such way that when the end effector contacts the surface of an object, the end effector acts on the object with a desired force wrench $\vec{F}_D(t)=\{\vec{f}_D(t), \vec{m}_D(t)\}$, wherein the actuating variables of the controller $u_m(t)=u_{m,R1}(t)+u_{m,R2}(t)$, where:

$\vec{f}_D(t):=$predefined force, $\vec{m}_D(t):=$predefined torque, $u_{m,R1}(t):=$actuating variables of the first controller R1, and $u_{m,R2}(t):=$actuating variables of the second controller R2;

wherein the first controller R1 is embodied and configured in such way that an actuating variable $u_{m,R1}(t)$ is determined as product of a variable $u_{m,R1}(t)^*$ output by controller R1 and a function $S(v(t))$, where:

$$u_{m,R1}(t)=S(v(t))\cdot u_{m,R1}(t)^*,$$

$$v(t)=v(\vec{F}_D(t), \vec{R}(t)),$$

$$v\in[v_a, v_e],$$

$S(v(t))$:=a monotonically decreasing function of v(t) that depends on $\vec{F}_D(t)$ and $\vec{R}(t)$, and $[v_a,v_e]$:=a predefined definition area of the variable v(t); or wherein the first controller R1 is embodied and configured in such way that the actuating variable $u_{m,R1}(t)$ output by controller R1 is determined as a Q-dimensional function $S^*(v^*(t),u_{m,R1}(t)^*)$, where:

$$u_{m,R1}(t)=S^*(v^*(t),u_{m,R1}(t)^*),$$

$$v^*(t)=v^*(\vec{F}_D(t),\vec{R}(t))=[v_1^*(\vec{F}_D(t),\vec{R}(t)), \ldots, v_Q^*(\vec{F}_D(t),\vec{R}(t))],$$

$$v^*(t)=[v_1^*(t),v_2^*(t), \ldots, v_Q^*(t)],$$

$$v_1^*(t) \in [v_{1a},v_{1e}], v_2^*(t) \in [v_{2a},v_{2e}], \ldots, v_Q^*(t) \in [v_{Qa},v_{Qe}],$$

$S^*(v^*(t),u_{m,R1}(t)^*)$:=a function where influence of $u_{m,R1}(t)^*$ is monotonically decreasing, and $[v_{1a},v_{1b}], \ldots$ :=component-wise predefined definition area of Q-dimensional variable $v^*(t)$; and wherein:

$u_{m,R1}(t)^*$:=a variable determined and output by the first controller R1 to generate the desired force wrench $\vec{F}_D(t)$, and $\vec{R}(t)$:=a control error of the controller.

2. The device according to claim 1, wherein, in a case that the object is elastic and its surface is flexible, the controller takes into consideration predefined elasticity properties of the object when determining the actuating variables $u_m(t)$.

3. The device according to claim 1, wherein a second unit is present, which serves as energy storage for passivation of the controller, and which stores energy T1 coming from the controller according to predefined energy storage dynamics, and delivers energy T2 to the controller, wherein the second unit and the controller form a closed loop, and an initialization of the second unit with energy T0 depends on a determined or predefined expenditure of energy $E_{Expenditure}$ to implement a current task of the robot manipulator.

4. The device according to claim 3, wherein stored energy E is a virtual energy or a physical energy.

5. The device according to claim 3, wherein an upper energy limit G1 is defined, and the second unit is embodied and configured such that $E \leq G1$ is always true for the stored energy E in the second unit.

6. The device according to claim 5, wherein a lower energy limit G2 is defined as: 0<G2<G1, and the second unit is embodied such that:

$G2 < E \leq G1$ is true for the stored energy E in the second energy unit, when the second unit is coupled to the controller; and $E \leq G2$ is true for the stored energy E in the second energy unit, when the second unit is uncoupled from the controller.

7. The device according to claim 1, wherein the first unit has a sensor system to register the external force wrench $\vec{F}_{ext}(t)=\{\vec{f}_{ext}(t),\vec{m}_{ext}(t)\}$ and/or an estimator to estimate the external force wrench $\vec{F}_{ext}(t)=\{\vec{f}_{ext}(t),\vec{m}_{ext}(t)\}$.

8. A robot comprising:

a robot manipulator having an end effector, driven by a number M of actuators $ACT_m$ where m=1, 2, . . . , M; and a device to perform open-loop and closed-loop control of the robot manipulator, the device comprising:

a first unit configured to register and/or make available an external force wrench $\vec{F}_{ext}(t)=\{\vec{f}_{ext}(t),\vec{m}_{ext}(t)\}$ acting on the end effector, where:

$\vec{f}_{ext}(t)$:=external force acting on the end effector, $\vec{m}_{ext}(t)$:=external torque acting on the effector; and a controller connected to the first unit and the actuators $ACT_m$, the controller comprising a first controller R1 and a second controller R2 connected therewith, the first controller R1 is a force controller, and the second controller R2 is an impedance controller, an admittance controller, a position controller, or a cruise controller, wherein the controller determines actuating variables $u_m(t)$, by which the actuators $ACT_m$ are actuated in such way that when the end effector contacts the surface of an object, the end effector acts on the object with a desired force wrench $\vec{F}_D(t)=\{\vec{f}_D(t),\vec{m}_D(t)\}$, wherein the actuating variables of the controller $u_m(t)=u_{m,R1}(t)+u_{m,R2}(t)$, where:

$\vec{f}_D(t)$:=predefined force, $\vec{m}_D(t)$:=predefined torque, $u_{m,R1}(t)$:=actuating variables of the first controller R1, and $u_{m,R2}(t)$:=actuating variables of the second controller R2, wherein the first controller R1 is embodied and configured in such way that an actuating variable $u_{m,R1}(t)$ is determined as product of a variable $u_{m,R1}(t)^*$ output by controller R1 and a function $S(v(t))$, where:

$$u_{m,R1}(t)=S(v(t)) \cdot u_{m,R1}(t)^*,$$

$$v(t)=v(\vec{F}_D(t),\vec{R}(t)),$$

$$v(t) \in [v_a,v_e],$$

$S(v(t))$:=a monotonically decreasing function of v(t) that depends on $\vec{F}_D(t)$ and $\vec{R}(t)$, and $[v_a,v_e]$:=a predefined definition area of the variable v(t); or wherein the first controller R1 is embodied and configured in such way that the actuating variable $u_{m,R1}(t)$ output by controller R1 is determined as a Q-dimensional function $S^*(v^*(t),u_{m,R1}(t)^*)$, where:

$$u_{m,R1}(t)=S^*(v^*(t),u_{m,R1}(t)^*),$$

$$v^*(t)=v^*(\vec{F}_D(t),\vec{R}(t))=[v_1^*(\vec{F}_D(t),\vec{R}(t)), \ldots, v_Q^*(\vec{F}_D(t),\vec{R}(t))]$$

$$v^*(t)=[v_1^*(t),v_2^*(t), \ldots, v_Q^*(t)],$$

$$v_1^*(t) \in [v_{1a},v_{1e}], v_2^*(t) \in [v_{2a},v_{2e}], \ldots, v_Q^*(t) \in [v_{Qa},v_{Qe}],$$

$S^*(v^*(t),u_{m,R1}(t)^*)$:=a function where influence of $u_{m,R1}(t)^*$ is monotonically decreasing, and $[v_{1a},v_{1b}], \ldots$ :=component-wise predefined definition area of Q-dimensional variable $v^*(t)$; and wherein:

$u_{m,R1}(t)^*$:=a variable determined and output by the first contoller R1 to generate the desired force wrench $\vec{F}_D(t)$, and $\vec{R}(t)$:=a control error of the controller.

9. A method of open-loop and closed-loop control of a robot manipulator having an end effector, driven by a number M of actuators $ACT_m$, where m=1, 2, ..., M, the method comprising:

registering and/or making available an external force wrench $\vec{F}_{ext}(t)=\{\vec{f}_{ext}(t),\vec{m}_{ext}(t)\}$ acting on the end effector, where:

$\vec{f}_{ext}(t):=$external force acting on the end effector, $\vec{m}_{ext}(t):=$external torque acting on the end effector; and determining by using a controller, the controller comprising a first controller R1, which is a force controller, and a second controller R2 connected therewith, the second controller R2 is an impedance controller, an admittance controller, a position controller, or a cruise controller, actuating variables $u_m(t)$, by which the actuators $ACT_m$ are actuated such that when the end effector contacts a surface of an object, the end effector acts on the object with a desired force wrench $\vec{F}_D(t)=\{\vec{f}_D(t),\vec{m}_D(t)\}$, wherein the actuating variables of the controller $u_m(t)=u_{m,R1}(t)+u_{m,R2}(t)$, where:

$\vec{f}_D(t):=$predefined force, $\vec{m}_D(t):=$predefined torque, $u_{m,R1}(t):=$actuating variables of the first controller R1, and $u_{m,R2}(t):=$actuating variables of the second controller R2, wherein the first controller R1 determines an actuating variable $u_{m,R1}(t)$ as product of a variable $u_{m,R1}(t)^*$ output by the controller R1 and a function $S(v(t))$, where:

$$u_{m,R1}(t)=S(v(t))\cdot u_{m,R1}(t)^*,$$

$$v(t)=v(\vec{F}_D(t),\vec{R}(t)),$$

$$v\in[v_a,v_e],$$

$S(v(t)):=$a monotonically decreasing function of $v(t)$ that depends on $\vec{F}_D(t)$ and $\vec{R}(t)$, and $[v_a,v_e]:=$a predefined definition area of the variable $v(t)$; or wherein the first controller R1 is embodied and configured in such war that the actuating variable $u_{m,R1}(t)$ output by controller R1 is determined as a Q-dimensional function $S^*(v^*(t),u_{m,R1}(t)$, where:

$$u_{m,R1}(t)=S^*(v^*(t),u_{m,R1}(t)^*),$$

$$v^*(t)=v^*(\vec{F}_D(t),\vec{R}(t))=[v_1^*(\vec{F}_D(t),\vec{R}(t)),\ldots,v_Q^*(\vec{F}_D(t),\vec{R}(t))],$$

$$v^*(t)=[v_1^*(t),v_2^*(t),\ldots,v_Q^*(t)],$$

$$v_1^*(t)\in[v_{1a},v_{1e}],v_2^*(t)\in[v_{2a},v_{2e}],\ldots,v_Q^*(t)\in[v_{Qa},v_{Qe}],$$

$S^*(v^*(t),u_{m,R1}(t)^*):=$a function where influence of $u_{m,R1}(t)^*$ is monotonically decreasing, and $[v_{1a},v_{1b}],\ldots:=$component-wise predefined definition area of Q-dimensional variable $v^*(t)$; and wherein:

$u_{m,R1}(t):=$a variable determined and output by the first controller R1 to generate the desired force wrench $\vec{F}_D(t)$, and $\vec{R}(t):=$a control error of the controller.

10. The method according to claim 9, wherein determining the manipulated variables $u_m(t)$ by the controller takes into consideration predefined elasticity properties of the object in case the object is elastic and therefore its surface is flexible.

11. The method according to claim 9, wherein the method comprises:

providing a second unit that serves as energy storage for passivation of the controller, wherein energy T1 coming from the controller is stored in the second unit according to predefined energy storage dynamics, and energy T2 from the second unit is delivered to the controller, wherein the second unit and the controller form a closed loop; and initializing the second unit with an energy T0 depending on a determined or predefined expenditure of energy $E_{Expenditure}$ to implement a current task of the robot manipulator.

12. A system to perform open-loop and closed-loop) control of a robot manipulator having an end effector, driven by a number M of actuators $ACT_m$, where m=1, 2, ..., M, the system comprising:

a data processing device; and storage medium storing instructions that, when executed by the data processing device, cause the data processing device to perform operation comprising:

registering and/or making available an external force wrench $\vec{F}_{ext}(t)=\{\vec{f}_{ext}(t),\vec{m}_{ext}(t)\}$ acting on the end effector, where:

$\vec{f}_{ext}(t):=$external force acting on the end effector, $\vec{m}_{ext}(t):=$external torque acting on the end effector; and determining by using a controller, the controller comprising a first controller R1, which is a force controller, and a second controller R2 connected therewith, the second controller R2 is an impedance controller, an admittance controller, a position controller, or a cruise controller, actuating variables $u_m(t)$, by which the actuators $ACT_m$ are actuated such that when the end effector contacts a surface of an object, the end effector acts on the object with a desired force wrench $\vec{F}_D(t)=\{\vec{f}_D(t),\vec{m}_D(t)\}$, wherein the actuating variables of the controller $u_m(t)=u_{m,R1}(t)+u_{m,R2}(t)$, where:

$\vec{f}_D(t):=$predefined force, $\vec{m}_D(t):=$predefined torque, $u_{m,R1}(t):=$actuating variables of the first controller R1, and $u_{m,R2}(t):=$actuating variables of the second controller R2, wherein the first controller R1 determines an actuating variable $u_{m,R1}(t)$ as product of a variable $u_{m,R1}(t)^*$ output by the controller R1 and a function $S(v(t))$, where:

$$u_{m,R1}(t)=S(v(t))\cdot u_{m,R1}(t)^*,$$

$$v(t)=v(\vec{F}_D(t),\vec{R}(t)),$$

$$v(t)\in[v_a,v_e],$$

$S(v(t)):=$a monotonically decreasing function of $v(t)$ that depends on $\vec{F}_D(t)$ and $\vec{R}(t)$, and $[v_a,v_e]$ a predefined definition area of the variable $v(t)$; or wherein the first controller R1 is embodied and configured in such way that the actuating variable $u_{m,R1}(t)$ output by controller R1 is determined as a Q-dimensional function $S^*(v^*(t),u_{m,R1}(t)^*)$, where:

$$u_{m,R1}(t)=S^*(v^*(t),u_{m,R1}(t)^*),$$

$$v^*(t)=v^*(\vec{F}_D(t),\vec{R}(t))=[v_1^*(\vec{F}_D(t),\vec{R}(t)), \ldots ,v_Q^*(\vec{F}_D(t),\vec{R}(t))],$$

$$v^*(t)=[v_1^*(t),v_2^*(t), \ldots ,v_Q^*(t)],$$

$$v_1^*(t) \in [v_{1a},v_{1e}], v_2^*(t) \in [v_{2a},v_{2e}], \ldots , v_Q^*(t) \in [v_{Qa},v_{Qe}],$$

$S^*(v^*(t),u_{m,R1}(t)^*)$:=a function where influence of $u_{m,R1}(t)^*$ is monotonically decreasing, and $[v_{1a},v_{1b}], \ldots$ :=component-wise predefined definition area of Q-dimensional variable $v^*(t)$; and wherein:

$u_{m,R1}(t)^*$:=a variable determined and output by the first controller R1 to generate of the desired force wrench $\vec{F}_D(t)$, and $\vec{R}(t)$:=a control error of the controller.

13. A non-transitory storage medium storing instructions to perform open-loop and closed-loop control of a robot manipulator having an end effector, driven by a number M of actuators $ACT_m$, where m=1, 2, . . . , M, the instructions when executed by a data processing device cause the data processing device to perform operations comprising:

registering and/or making available an external force wrench $\vec{F}_{ext}(t)=\{\vec{f}_{ext}(t),\vec{m}_{ext}(t)\}$ acting on the end effector, where:

$\vec{f}_{ext}(t)$:=external force acting on the end effector, $\vec{m}_{ext}(t)$:=external torque acting on the end effector; and determining by using a controller, the controller comprising a first controller R1, which is a force controller, and a second controller R2 connected therewith, the second controller R2 is an impedance controller, an admittance controller, a position controller, or a cruise controller, actuating variables $u_m(t)$, by which the actuators $ACT_m$ are actuated such that when the end effector contacts a surface of an object, the end effector acts on the object with a desired force wrench $\vec{F}_D(t)=\{\vec{f}_D(t),\vec{m}_D(t)\}$, wherein the actuating variables of the controller $u_m(t)=u_{m,R1}(t)+u_{m,R2}(t)$, where:

$\vec{f}_D(t)$:=predefined force, $\vec{m}_D(t)$:=predefined torque, $u_{m,R1}(t)$:=actuating variables of the first controller R1, and $u_{m,R2}(t)$:=actuating variables of the second controller R2, wherein the first controller R1 determines an actuating variable $u_{m,R1}(t)$ as product of a variable $u_{m,R1}(t)^*$ output by the controller R1 and a function $S(v(t))$, where:

$$u_{m,R1}(t)=S(v(t)) \cdot u_{m,R1}(t)^*,$$

$$v(t)=v(\vec{F}_D(t),\vec{R}(t)),$$

$$v(t) \in [v_a,v_e],$$

$S(v(t))$:=a monotonically decreasing function of $v(t)$ that depends on $\vec{F}_D(t)$ and $\vec{R}(t)$, and $[v_a,v_e]$:=a predefined definition area of the variable $v(t)$; or wherein the first controller R1 is embodied and configured in such way that the actuating variable $u_{m,R1}(t)$ output by controller R1 is determined as a Q-dimensional function $S^*(v^*(t),u_{m,R1}(t)^*)$, where:

$$u_{m,R1}(t)=S^*(v^*(t),u_{m,R1}(t)^*),$$

$$v^*(t)=v^*(\vec{F}_D(t),\vec{R}(t))=[v_1^*(\vec{F}_D(t),\vec{R}(t)), \ldots ,v_Q^*(\vec{F}_D(t),\vec{R}(t))],$$

$$v^*(t)=[v_1^*(t),v_2^*(t), \ldots ,v_Q^*(t)],$$

$$v_1^*(t) \in [v_{1a},v_{1e}], v_2^*(t) \in [v_{2a},v_{2e}], \ldots , v_Q^*(t) \in [v_{Qa},v_{Qe}],$$

$S^*(v^*(t),u_{m,R1}(t)^*)$:=a function where influence of $u_{m,R1}(t)^*$ is monotonically decreasing, and $[v_{1a},v_{1b}], \ldots$ :=component-wise predefined definition area of Q-dimensional variable $v^*(t)$; and wherein:

$u_{m,R1}(t)^*$:=a variable determined and output by the first controller R1 to generate the desired force wrench $\vec{F}_D(t)$, and $\vec{R}(t)$:=a control error of the controller.

* * * * *